Aug. 30, 1932.  J. B. ROMBOUGH  1,875,158
MOUTH CLAMP
Filed May 2, 1930
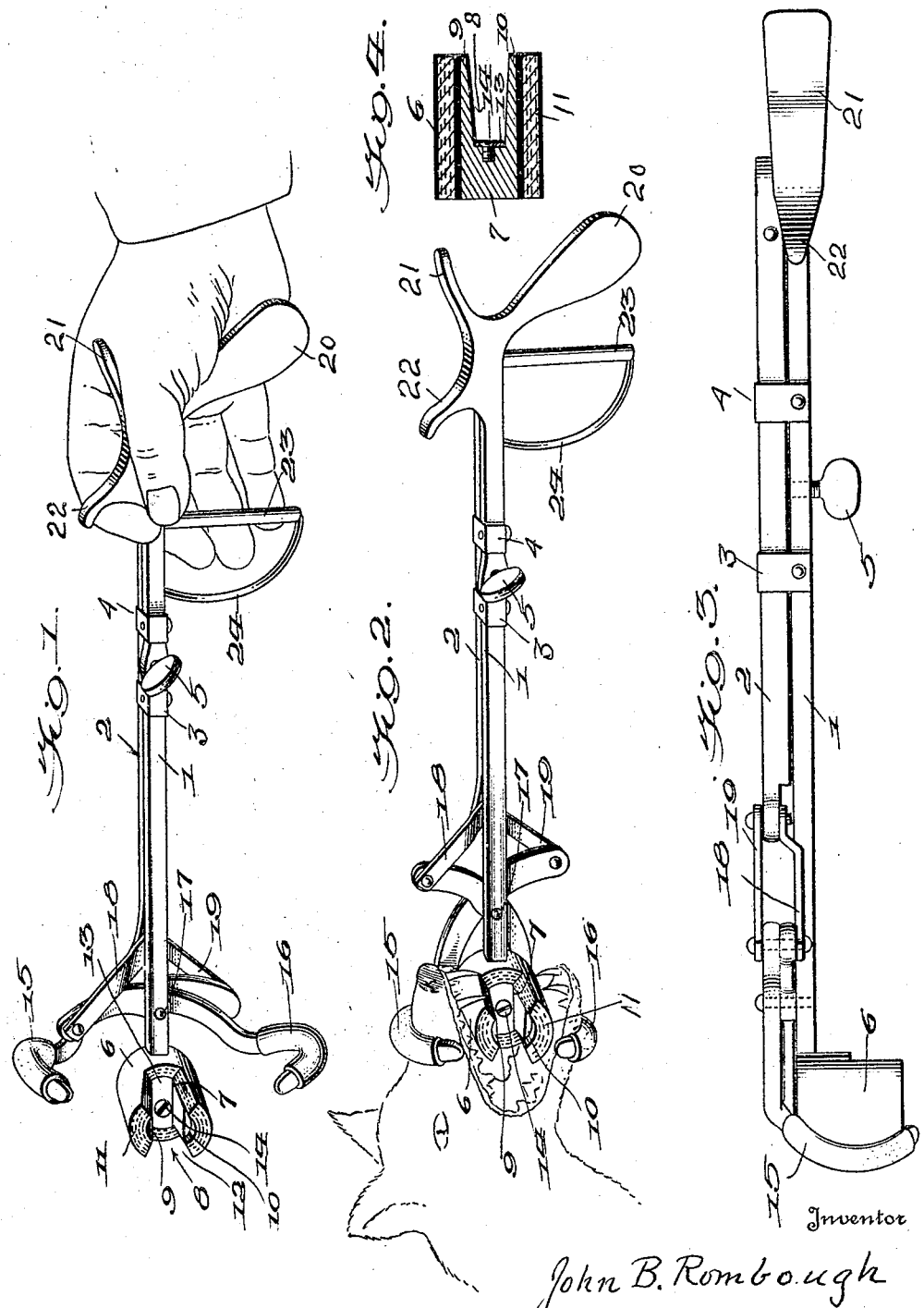
Inventor
John B. Rombough
By A. P. Greeley
Attorney Patented Aug. 30, 1932

1,875,158

UNITED STATES PATENT OFFICE

JOHN BARNHART ROMBOUGH, OF NIAGARA FALLS, NEW YORK

MOUTH CLAMP

Application filed May 2, 1930. Serial No. 449,327.

My invention relates to mouth clamps for handling animals and has for its object to improve and simplify the mouth clamp described and shown in United States Patent No. 1,496,132, issued to me June 3, 1924, and reissued August 24, 1926 as Reissue 16,409. A particular object of my present invention is to so improve the gag of my patent and reissue as to give greater access to the mouth of the animal held in the clamp. A further object of my invention is to so improve the handle portion of the device that the device may be manipulated by one hand to present the gag to the animal and to clamp its jaws. A further object of my invention is to enable the jaw clamping means to be locked in closed position.

With the objects above indicated and other objects hereinafter described in view my invention consists in the construction and combination of elements hereinafter described and claimed.

Referring to the drawing:

Figure 1 is a side view of a mouth clamp embodying my invention showing the jaw clamps in open position.

Figure 2 is a view similar to Figure 1 but showing the jaw clamps in closed position.

Figure 3 is a top plan view of the mouth clamp shown in Figures 1 and 2, and

Figure 4 is a vertical central sectional view of the gag.

The mouth clamp shown in the drawing is similar in construction to that shown in my patent and reissue above referred to in that it comprises a handle member having at its forward or operating end a gag to be gripped by an animal and clamping members to be closed onto the animal's jaws, and a sliding member movable with reference to the handle member provided at its forward end with means for operating the clamping members but differs from such mouth clamp shown in my patent and reissue in details of construction.

In my present construction 1 indicates the handle member and 2 indicates the sliding member. The sliding member is arranged on the right hand side of the handle member instead of the left hand side as in my patent and reissue, and is held to it by guide loops 3 and 4. Between these guide loops is arranged a thumb screw 5 in a screw threaded opening in member 1 with its end adapted to bear against the sliding member.

6 indicates the gag carried on the operating end of handle member 1 and extends to the left instead of to the right as in my patent and reissue. This gag is carried by a cylindrical head 7 extending laterally from the end of handle member 1 and having extending through its centre from its outer end towards the handle member an open ended slot 8, the width of the slot being such that walls 9 and 10 are left above and below it so as to form a rigid support for an enclosing piece 11 of tubing of rubber or the like which forms the exterior of the gag. Through this piece of tubing is formed an open ended slot 12 in line with and corresponding in width with slot 8 in head 7. This piece of tubing 11 fits the outer periphery of head 7 and its open ended slot 12 terminates in the plane of the inner end of open ended slot 8 of head 7. To ensure the piece of tubing against movement a cross plate 13 is secured by screw 14 against head 7 at the inner end of slot 8.

The opening in the gag formed by open ended slots 8 and 12 gives better access to the mouth of the animal held by the clamping members for examination and for administration of medicines or other treatment of the mouth of the animal than is afforded by the opening through the gag shown in my patent and reissue.

15, 16, indicate jaw clamping members similar to the jaw clamping members of my patent and reissue. They are pivoted at 17 to handle member 1 and carry at their forward ends clamping arms adapted to enclose the jaws of the animal. Their rearwardly extending ends are pivotally connected to links 18, 19, the other ends of which are pivotally connected to the forward end of sliding member 2.

At its rear end handle member 1 is provided with downward extension 20 shaped to fit the palm of the operator, rearward and upward extension 21 adapted to extend rearward between the thumb and fore finger of the operator, and upward and forward extension 22 adapted to receive between it and the upper face of handle member 1 the fore finger of the operator. By reason of these extensions 20, 21, and 22, the operator is enabled to so grasp and hold the device with one hand as to direct it in any desired direction.

At its rear end sliding member 2 is provided with downward extension 23 adapted to be grasped by the fingers other than the index finger so that by closing the fingers the sliding member will be drawn rearward to cause, through links 18, 19, jaw clamping members to close on the jaws of the animal which has gripped the gag. Forward of downward extension 23 is a guard 24 with its upper end secured to, preferably in one piece with, the lower face of sliding member 2 and its lower end secured to, preferably in one piece with, the lower end of downward extension 23, and by pressing forward the three fingers inserted in loop 23, 24, opens the jaws of the clamp to release the animal.

The construction above described makes it possible for the operator to present the gag to the animal and to close the jaw clamping members upon the animal's jaws with one hand, leaving the other hand free to operate screw to clamp the sliding member in closed position.

Having thus described my invention what I claim is:

1. In a mouth clamp a handle member having at one end a gag adapted to be inserted between the jaws of an animal and a clamping jaw so arranged with reference to the gag that it may engage the exterior of one of its jaws, and a sliding member movable on the handle member provided with means for operating the clamping jaw, the gag having an open ended slot extending diametrically through it in line with the handle member and extending axially of the gag from its outer end inward towards the handle member.

2. In a mouth clamp a handle member having at one end a gag adapted to be inserted between the jaws of an animal and a pair of clamping jaws so arranged with reference to the gag that they may enclose between them the exterior of its jaws, and a sliding member movable on the handle member provided with means for operating the clamping jaws, the gag having an open ended slot extending diametrically through it in line with the handle member and extending axially of the gag from its outer end inward towards the handle member.

3. In a mouth clamp a handle member having at one end a gag adapted to be inserted between the jaws of an animal and a clamping jaw so arranged with reference to the gag that it may engage the exterior of one of its jaws, and a sliding member movable on the handle member provided with means for operating the clamping jaw, the gag having an open ended slot extending diametrically through it in line with the handle member and extending axially of the gag from its outer end inward towards the handle member, the handle member being provided with means adapted to so fit the hand of the operator that it may be supported and directed by one hand.

4. In a mouth clamp a handle member having a gag adapted to be inserted between the jaws of an animal and a clamping jaw so arranged with reference to the gag that they may engage the exterior of one of its jaws, and a sliding member movable on the handle member provided with means for operating the clamping jaw, the gag having an open ended slot extending through it in line with the handle member, the handle member provided with a downward extension adapted to fit within the palm of the operator, a rearward extension adapted to fit between his thumb and forefinger and a forward extension adapted to be received beneath his forefinger.

5. In a mouth clamp a handle member having a gag adapted to be inserted between the jaws of an animal and a clamping jaw so arranged with reference to the gag that it may engage the exterior of one of its jaws, and a sliding member movable on the handle member provided with means for operating the clamping jaw, the gag having an open ended slot extending through it in line with the handle member, the handle member provided with a downward extension adapted to fit within the palm of the operator, a rearward extension adapted to fit between his thumb and forefinger, and a forward extension adapted to be received beneath his forefinger, and the sliding member provided with a downward extension formed of the downward extension in position to be grasped by the fingers of the hand of the operator.

6. In a mouth clamp a handle having a gag adapted to be inserted between the jaws of an animal and a clamping jaw adapted to engage the exterior of one of its jaws, and a sliding member movable on the handle member provided with means for operating the clamping jaw, the gag having an open ended slot extending through it in line with the handle member, the handle member provided with a downward extension adapted to fit within the palm of the operator, a rearward extension adapted to fit between his thumb and forefinger and a forward extension adapted to receive beneath his forefinger, and the sliding member provided with a downward extension forward of the downward extension in position to be grasped by the fingers of the hand of the operator, and means for locking the handle member and sliding member together.

In testimony whereof, I hereunto affix my signature.

J. B. ROMBOUGH.